United States Patent
Mizikovsky et al.

(10) Patent No.: US 7,602,918 B2
(45) Date of Patent: Oct. 13, 2009

(54) METHOD FOR DISTRIBUTING SECURITY KEYS DURING HAND-OFF IN A WIRELESS COMMUNICATION SYSTEM

(75) Inventors: Semyon B. Mizikovsky, Morganville, NJ (US); Robert J. Rance, Andover, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 832 days.

(21) Appl. No.: 11/173,144

(22) Filed: Jun. 30, 2005

(65) Prior Publication Data

US 2007/0003062 A1  Jan. 4, 2007

(51) Int. Cl.
 *H04K 1/00* (2006.01)
 *H04L 9/00* (2006.01)
(52) U.S. Cl. .................... 380/270; 380/255; 380/259
(58) Field of Classification Search ............. 380/270, 380/259, 255
 See application file for complete search history.

(56) References Cited

FOREIGN PATENT DOCUMENTS

| EP | 1422875 A2 | 11/2003 |
| EP | 1439667 A2 | 7/2004 |
| WO | WO 00/76194 A1 | 12/2000 |

OTHER PUBLICATIONS

Location-Based Pairwise Key Establishment and Data Authentication for Wireless Sensor Networks Cungang Yang; Jie Xiao; Information Assurance Workshop, 2006 IEEE Jun. 21-23, 2006 pp. 247-252.*
An Efficient Scheme for User Authentication in Wireless Sensor Networks Canming Jiang; Bao Li; Haixia Xu; Advanced Information Networking and Applications Workshops, 2007, AINAW '07. 21st International Conference on vol. 1, May 21-23, 2007 pp. 438-442.*
A Minimal Protocol for Authenticated Key Distribution in Wireless Sensor Networks Singh, K.; Muthukkumarasamy, V.; Intelligent Sensing and Information Processing, 2006. ICISIP 2006. Fourth International Conference on Oct. 15-Dec. 18, 2006 pp. 78-83.*
International PCT/US2006/024253 Search Report dated Nov. 23, 2007.
Wang et al., "Security Context Transfer in Vertical Handover" The 14th IEEE 2003 International Symposium on Personal Indoor and Mobile Radio Communication Proceedings pp. 2775-2779; Sep. 2003.

* cited by examiner

Primary Examiner—David Y Jung

(57) ABSTRACT

The present invention provides a method of wireless communication involving at least one first base station associated with a first access serving network and at least one second base station associated with a second access serving network is provided. The method may include generating a first key associated with the first access serving network and the second base station, receiving information indicating that the first key is temporary, and establishing a communication link with the second base station using the first key.

21 Claims, 2 Drawing Sheets

METHOD FOR DISTRIBUTING SECURITY KEYS DURING HAND-OFF IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Access points are used to provide wireless connectivity to one or more mobile units in a wireless communication system. Exemplary access points may include base stations, base station routers, Access Serving Networks (ASNs), WiMAX routers, and the like. Mobile units may include cellular telephones, personal data assistants, smart phones, text messaging devices, laptop computers, desktop computers, and the like. The access point also provides connectivity to one or more outside networks. For example, in a wireless network that operates according to an IEEE 802.16 protocol, a mobile unit may establish a wireless connection with a WiMAX router, which may include one or more Access Serving Network (ASN) entities and one or more base stations. The WiMAX router may be connected to one or more Connectivity Serving Networks (CSN) that provides connectivity to an outside network.

Security associations may be established and maintained to allow secure communications between mobile units and the serving network. For example, systems that operate according to the IEEE 802.16e and/or WiMAX standards may use the Privacy and Key Management, version 2, (PKMv2) protocol with Extensible Authentication Protocol (EAP) for user authentication and device authorization. The PKMv2 protocol supports device authorization and user authentication between a mobile unit and a home Network Service Provider (NSP) using a three-party scheme.

The three parties in the PKMv2 protocol are the supplicant, the authenticator, and the authentication server. A supplicant is an entity at one end of a point-to-point link that is being authenticated by an authenticator attached to the other end of that link. An authenticator is an entity at one end of a point-to-point link that facilitates authentication of supplicants that may be attached to the other end of the point-to-point link. The authenticator enforces authentication before allowing the supplicant access to services in the network. An authentication server is an entity that provides an authentication service to an authenticator and a supplicant. This authentication server uses the credentials provided by the supplicant to determine whether the supplicant is authorized to access the services provided via the authenticator. For example, in a WiMAX system, the supplicant is the mobile unit, the authenticator resides in the Access Serving Network (ASN), and the authentication server is implemented in an authentication, authorization, and accounting (AAA) server in the Connectivity Serving Network (CSN).

The Extensible Authentication Protocol (EAP) is an encapsulation protocol used to transport packet data units (PDUs) that may be used to negotiate an authentication method between the supplicant and the authentication server. The Extensible Authentication Protocol may be encapsulated within other protocols such as the PKMv2 protocol, the 802.16 protocol, a RADIUS or DIAMETER protocol, a Universal Datagram Protocol (UDP), a Transmission Control Protocol (TCP), an Internet Protocol (IP), and the like. The RADIUS protocol and possibly the DIAMETER protocol are the de facto transport protocols for EAP over IP networks between the authenticator and authentication server. The Extensible Authentication Protocol (EAP) supports cryptographically strong key-deriving methods such as EAP-TLS, EAP-AKA and EAP-MSCHAPv2, as well as reuse of user credential types across WiMAX networks.

Secure connections are typically established according to a security model that specifies an operational relationship between the supplicant, the authenticator, and the authentication server. For example, a four phase security model may be used. In the first phase, a supplicant (e.g., a mobile unit) discovers one or more available base stations that can provide wireless connectivity in a coverage area and selects a particular base station as a preferred (or serving) base station. The mobile unit then discovers configuration data, and the discovery may occur statically and/or dynamically. In the second phase, the supplicant presents its credentials to the authenticator, which forwards the supplicant's credentials to the authentication server. Depending on the authentication method being negotiated, multiple roundtrip communications between the various entities may be used. If the authentication procedure succeeds, the authentication server forwards a session-related key to the authenticator in the third phase. The authentication server also forwards information that may be used to generate the session-related key to the supplicant. The session-related keys held by the authenticator and the supplicant are used to establish a security association manifested by a pair of secret symmetric keys, which may be used to generate keys to protect data transmitted in the fourth phase.

In systems that operate according to the IEEE 802.16 and WiMAX standards, a symmetric key called the Master Key (MK) is pre-provisioned into the supplicant and the authentication server upon initialization of the supplicant's subscription. The Master Key represents the current subscription-based security association and only the supplicant and the authentication server can possess Master Key, which demonstrates authorization to make a decision on behalf of supplicant. An example of a Master Key is the root key used in authentication and key agreement (AKA) protocols. The supplicant and/or the authentication server can generate a Master Session Key (MSK) and/or an Extended Master Session Key (EMSK) from the Master Key. The Master Session Key is typically used for fixed subscribers and the Extended Master Session Key is typically used for mobile subscribers. These keys may be derived as recommended in section 7.10 of the IETF RFC-3748 "Extensible Authentication Protocol."

The supplicant and the authentication server may derive an AAA-key based on the Master Session Key (or the Extensible Master Session Key). The authentication server populates the AAA-Key into the corresponding authenticator using, for example, the RADIUS and/or DIAMETER protocols to establish a security association between the supplicant, the authenticator, and the authentication server. The supplicant and the authenticator each generate one of a pair of secret symmetric keys, which may be referred to as Pairwise Master Keys (PMKs), using the AAA-key. The IEEE 802.16 and WiMAX standards state that the supplicant and the authenticator derive the Pairwise Master Keys by truncating the AAA-key. Generation of the Pairwise Master Keys marks the successful completion of the Credential Verification and User Authentication phase, i.e. the second phase described above.

The supplicant and the authenticator may each generate a copy of an Authorization Key (AK) using the Pairwise Master Key. For example, the Authorization Key may be computed from the Pairwise Master Key using a pseudo-random function (prf) transform of Base Station and Mobile Station identifiers (BS_ID and MS_ID, respectively):

$AK_i = prf(PMK, BS\_ID, MS\_ID, \ldots)$

Accordingly, the Authorization Key used by the supplicant and the authenticator remains the same as long as the supplicant remains in contact with the same base station and uses the same Pairwise Master Key. However, the IEEE 802.16e and WiMAX draft standards state that the Pairwise Master Key should not be shared with a (less trusted) target access serving network when a supplicant (e.g., a mobile unit) hands-off from a base station in a source access serving network to a base station in the target access serving network. Instead, the target access serving network should generate a new Pairwise Master Key by executing an Initial Entry EAP authentication process, as described above, which requires accessing the authentication server, e.g., the Home AAA Server.

The supplicant does not know that the access serving network has changed when the supplicant hands off from a base station in the source access serving network to a base station in the target access serving network. Consequently, the supplicant does not know that the current value of the Pairwise Master Key will not be shared with the target access serving network. Since the supplicant cannot distinguish between contiguous entry and initial entry into the target access serving network, the supplicant does not know that the authenticator associated with the new base station in the target access network is different from the initial authenticator, and that the new authenticator does not possess the current Pairwise Master Key. Therefore, following the inter-system handoff, the supplicant will continue to compute the Authorization Key based on the Pairwise Master Key from the source access serving network, the supplicant's MS_ID, and the BS_ID of the new target base station.

To preserve the communication link between the supplicant and the target base station during a handoff, the source access serving network may provide an Authorization Key to the target base station, but this key will also be computed based on the Pairwise Master Key from the source access serving network, the supplicant's MS_ID, and the BS_ID of the new target base station. Providing security key material to the less trusted target base station and/or target access serving network may increase security risks associated with the supplicant, the target base station, and/or the target access serving network. For example, an adversary in the less trusted access serving network may have an opportunity to determine the value of the Pairwise Master Key from the Authorization Key, particularly if the Pairwise Master Key and, therefore, the Authorization Key are used for a relatively long period of time. Once the value of the old Pairwise Master Key has been determined, the adversary may be able to decrypt communications associated with the current session and any older sessions that utilized the same key material.

To prevent this potential security risk, the source access serving network may not provide a copy of the Pairwise Master Key. Instead, the supplicant and the target access serving network may be required to negotiate a new security association after the handoff into an untrusted serving network. For example, the supplicant and the target access serving network may invoke the complete EAP authentication procedure with the Home AAA Server (HAAA), as described above. However, as discussed above, the supplicant typically does not know that it has entered a new (less trusted) target access serving network. Thus, the supplicant may not know that it is necessary to negotiate the new security association. Moreover, the complete EAP procedure typically requires a lengthy exchange that may include multiple transactions, and so the complete EAP procedure may be unreliable in a handoff region due to the poor link conditions during the hand off. Accordingly, renegotiating a security association during the handoff may increase the likelihood that the communication link is dropped during the handoff.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for wireless communication involving at least one first base station associated with a first access serving network and at least one second base station associated with a second access serving network. The method may include generating a first key associated with the first access serving network and the second base station, receiving information indicating that the first key is temporary, and establishing a communication link with the second base station using the first key.

In another embodiment of the present invention, a method is provided for wireless communication involving a mobile unit, at least one first base station associated with a first access serving network, and at least one second base station associated with a second access serving network. The method includes providing information indicative of a first key associated with the first access serving network and the second base station and providing information indicating that the first key is temporary.

In yet another embodiment of the present invention, a method is provided for wireless communication involving a mobile unit, at least one first base station associated with a first access serving network, and at least one second base station associated with a second access serving network. The method includes receiving information indicative of a first key associated with the first access serving network and the second base station, receiving information indicating that the first key is temporary, and establishing a communication link with the mobile unit using the first key.

BRIEF DESCRIPTION OF THE DRAWINGS

The invention may be understood by reference to the following description taken in conjunction with the accompanying drawings, in which like reference numerals identify like elements, and in which.

Figure 1:
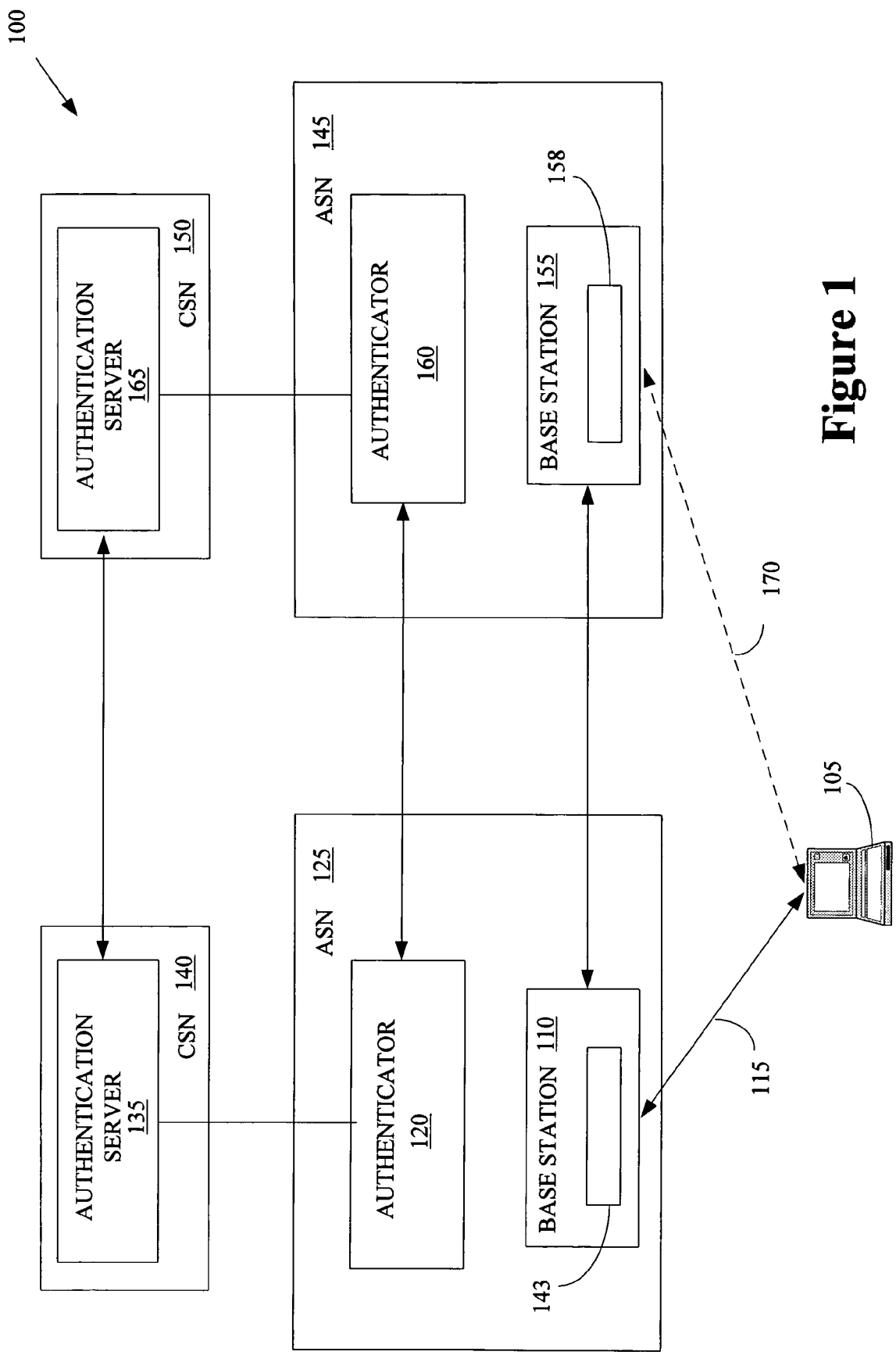
FIG. 1 conceptually illustrates one exemplary embodiment of a communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment, the communication system 100 includes a supplicant 105 that is in communication with a base station 110 via an air interface 115. Exemplary supplicants 105 include but are not limited to cellular telephones, personal data assistants, smart phones, text messaging devices, laptop computers, desktop computers, and the like. Although the base station 110 is shown in FIG. 1, persons of ordinary skill in the art should appreciate that any other type of access point may be used. In alternative embodiments, exemplary access points may include base station routers, Access Serving Networks (ASNs), WiMAX routers, and the like. The supplicant 105 and the base station 110 may communicate over the air interface 115 according to any protocol or combination of protocols. For example, the supplicant 105 and the base station 110 may communicate over the air interface 115 according to a Universal Mobile Telecommunication System (UMTS) protocol, a Global System for Mobile communication (GSM) protocol, a Code Division Multiple Access (CDMA, CDMA 2000) protocol, an IEEE 802.11 protocol, an IEEE 802.16 protocol, a Bluetooth protocol, and the like. Accordingly, only those aspects of the communication protocols that are relevant to the present invention will be discussed herein.

The base station 110 is communicatively coupled to an authenticator 120 that may be implemented in an access serving network (ASN) 125. Although the access serving network 125 shown in FIG. 1 includes a single base station 110, persons of ordinary skill in the art having benefit of the present disclosure should appreciate that the present invention is not limited to a single base station 110 per access serving network 125. In alternative embodiments, the access serving network 125 may include any number of base stations 110. Although FIG. 1 depicts the authenticator 120 and the base station 110 as separate functional elements within the access serving network 125, persons of ordinary skill in the art should also appreciate that the access serving network 125, the authenticator 120, and/or the base station 110 may be implemented in any number of physical devices.

The authenticator 120 is communicatively coupled to an authentication server 135 that is implemented in the connectivity serving network 140. In the illustrated embodiment, a security association exists between the authentication server 135 and the authenticator 120 to protect communications between them. This security association can be established between the access serving network 125 and the connectivity serving network 140 based on business agreements between operators of these networks. The access serving network 125 and the connectivity serving network 140 are considered part of a trusted domain because of the security association between the authenticator 120 and the authentication server 135.

Another security association exists between the authentication server 135 and the supplicant 105. This security association is established based on the supplicant's subscription. The supplicant 105 and the connectivity serving network 140 are considered part of another trusted domain because of the security association between the supplicant 105 and the authentication server 135. The security association is established and/or maintained based upon one or more security keys. For example, if the communication system 100 operates according to the IEEE 802.16 and/or WiMAX standards, the supplicant 105 and the authentication server 135 can derive an AAA-key based on a Master Session Key (or an Extensible Master Session Key). The authentication server 135 may then populate the AAA-Key into the authenticator 120 using, for example, the RADIUS and/or DIAMETER protocols to establish the security association between the supplicant 105, the authenticator 120, and the authentication server 135. In a three party trust model, based on validation of security association between the supplicant 105 and authentication server 135, the session-limited security association is created between the supplicant 105 and access serving network authenticator 125. Parameters defining this security association, such as security keys specific to this security association, are distributed from the authentication server 135 to the authenticator 125 under protection of existing security association between the authentication server 135 and the authenticator 125.

In the illustrated embodiment, a security association created between the authenticator 120 and the supplicant 105 is represented by a pair of secret symmetric keys, one of which is stored in the authenticator 120 and one of which is stored in the supplicant 105. For example, if the communication system 100 operates according to the IEEE 802.16 and/or WiMAX standards, the supplicant 105 and the authenticator 120 each generate a copy of a Pairwise Master Key (PMK) using the AAA-key. The copies of the Pairwise Master Key may then be stored by the supplicant 105 and the authenticator 120, respectively.

The supplicant 105 and the authenticator 120 may generate additional security keys using a Pairwise Master Key. In one embodiment, an Authorization Key is computed from the Pairwise Master Key using a pseudo-random function (prf) transform of Base Station and Mobile Station identifiers (BS_ID and MS_ID, respectively). The supplicant 105 and the authenticator 120 may also generate a Key-Encryption Key (KEK) by using a defined pseudo-random function (PRF):

$$KEK = PRF(AK, \text{other known static parameters}).$$

User traffic that is sent over the air interface 115 may be encrypted with a secret key, such as a Traffic Encryption Key (TEK). The base station 110 may at any time decide to create a new random TEK. New values of the TEK may be encrypted using the KEK as:

$$TEK' = ENC(TEK)_{KEK}.$$

The encrypted TEK' can then be sent to the supplicant 105 over the air interface 115. The supplicant 105 may decrypt the encrypted TEK' and both the supplicant 105 and the base station 110 may use the TEK (as well as various sequence counters or numbers associated with the data packets) to encrypt and decrypt the traffic channel data. In one embodiment, the base station 110 includes a buffer 143 that may be used to store data before it is transmitted to the supplicant 105 over the air interface 115. Data may be pre-encrypted using the TEK and the sequence counters before being stored in the buffer 143. Alternatively, data may be encrypted just prior to being transmitted to the supplicant 105.

The communication system 100 may also include one or more less trusted (or un-trusted) domains. In the illustrated embodiment, an access serving network 145 and a connectivity serving network 150 are in a less trusted domain. The access serving network 145 may include one or more base stations 155 (including one or more buffers 158) and authenticators 160, and the connectivity serving network 150 may include an authentication server 165. The access serving network 145 and the connectivity serving network 150 are considered to be in a less trusted domain because there is no security association between the supplicant 105, the authenticator 160, and the authentication server 165. Similarly, no security association, such as the security association represented by a pair of secret symmetric keys, exists between the supplicant 105 and the authenticator 160. Consequently, if the supplicant 105 hands off from the base station 110 to the base station 155, the authenticator 160 may not be able to generate the Authorization Key currently being used by the supplicant 105.

The base station 110 may therefore generate a temporary Authorization Key using the Pairwise Master Key and an identifier associated with the base station 155. The base station 110 may then provide a copy of the temporary Authorization Key to the base station 155. The base station 110 may also provide an indication that the copy of the Authorization Key is temporary and should be regenerated as soon as possible. In one embodiment, the base station 110 may also provide contents of the buffer 143 and/or the TEK to the base station 155, which may store the information in the buffer 158. The base station 155 may then establish a security association with the supplicant 105 using the temporary Authorization Key so that the supplicant 105 in the base station 155 can communicate over air interface 170. The supplicant 105 may also receive information indicating that the temporary Authorization Key is temporary and should be regenerated as soon as possible, as discussed in detail below.

Figure 2:
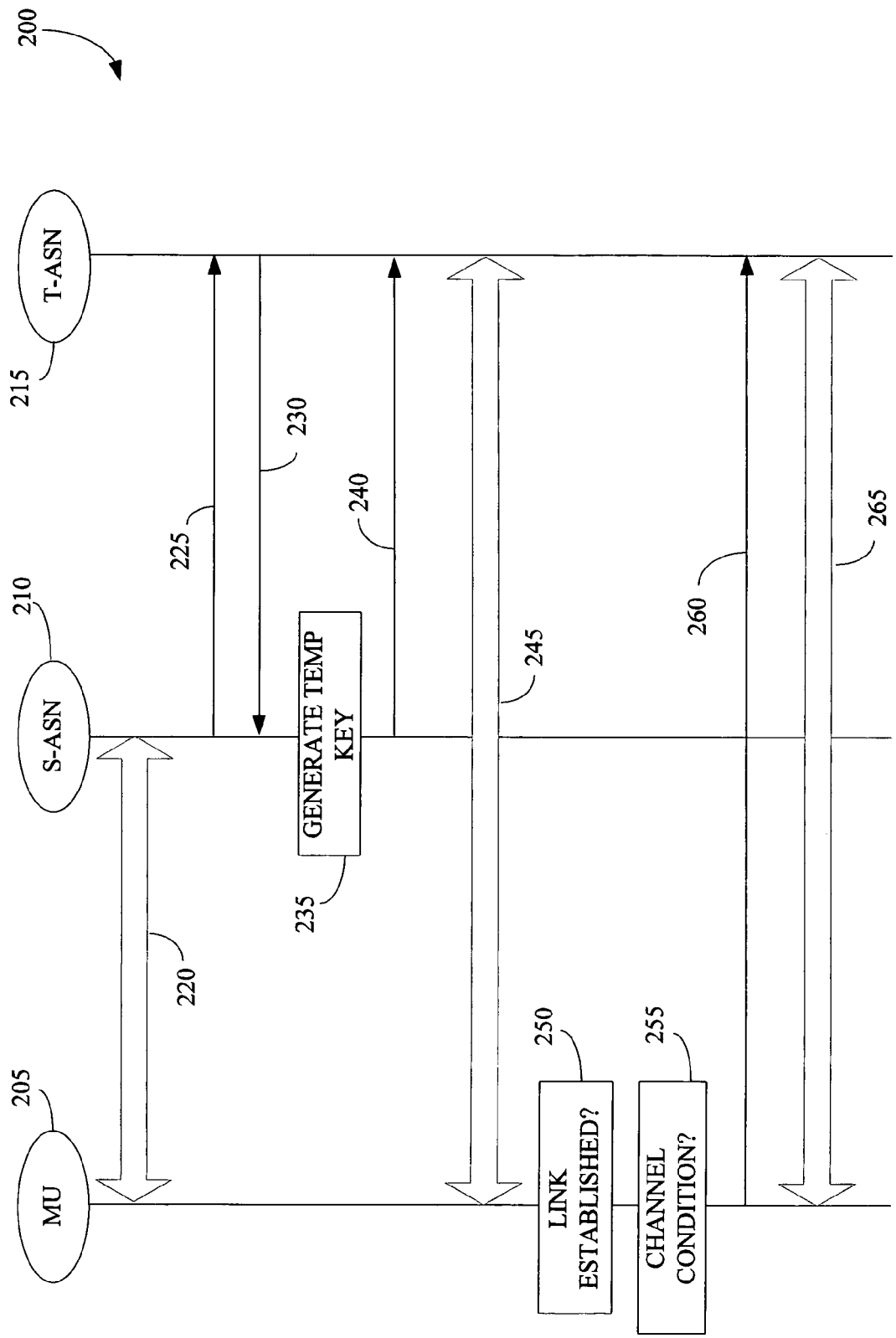
FIG. 2 conceptually illustrates one exemplary embodiment of a method of distributing security keys, in accordance with the present invention.

FIG. 2 conceptually illustrates one exemplary embodiment of a method 200 of distributing security keys. In the illustrated embodiment, a mobile unit (MU) 205 hands off from a base station (not shown) in a source access serving network (S-ASN) 210 to a base station (not shown) in a target access serving network (T-ASN) 215. The mobile unit 205 initially establishes a security association (represented by a Pairwise Master Key) with the source access serving network 210, which may be considered an anchor for the PMK security association. In one embodiment, the source access serving network 210 can pre-compute and pre-populate Authorization Keys into base stations that are associated with the source access serving network 210. Pre-population of Authorization Keys allows the base stations in the trusted zone to quickly establish secure communications with the mobile unit 205 without additional signaling with the source access serving network 210. The mobile unit 205 may later provide an indication of a handoff from the base station in the source access serving network 210 to a base station in the target access serving network 215. Initialization of the security association and the indication of the impending handoff are represented by the double headed arrow 220.

When the mobile unit 205 attempts to hand off from the base station in the source access serving network 210 to the base station in the target access serving network 215, the base station in the source access serving network 210 indicates (at 225) to the base station in the target access serving network 215 that the source access serving network 210 is an anchor for the current security association. For example, the base station in the source access serving network 210 may provide (at 225) an indication that the source access serving network 210 is the holder of the active PMK. The base station in the target access serving network 215 may then provide (at 230)

a request for a copy of the temporary Authorization Key to the source access serving network 210.

Since the targeted base station is in the un-trusted domain, i.e. it is associated with the un-trusted target access serving network 215, the source access serving network 210 generates (at 235) a temporary Authorization Key using the currently active Pairwise Master Key, an identifier associated with the target base station, and any other available information. The source base station transmits (at 240) the temporary Authorization Key to the target base station. The source base station may also transmit (at 240) information indicating that the mobile unit 205 and the target access serving network 215 should negotiate a new security association as soon as possible. For example, the source base station may transmit (at 240) information indicating that the mobile unit 205 and the target access serving network 215 should negotiate a new Pairwise Master Key as soon as the hand-off procedures are completed and channel conditions are expected to be reliable enough to conduct the full mutually authenticated PMK generation procedure with the target access serving network 215.

In one embodiment, unsent pre-encrypted data may be forwarded (at 240) from the source base station to the target base station. The Traffic Encryption Key that was used for encryption and values of associated sequence numbers may also be forwarded (at 240) from the source base station to the target base station. The value of a minimum acceptable sequence number for a reverse channel may also be forwarded (at 240) to the target base station. As the values of sequence numbers approach their maximum limit, a new TEK may be established, which should increase the likelihood that the combination of the key and the cryptographic synchronization is unique and does not repeat.

The mobile unit 205 may establish (at 245) the communication link with the base station in the target access serving network 215. Techniques for establishing (at 245) the communication link are known to persons of ordinary skill in the art and, in the interest of clarity, only those aspects of this procedure that are relevant to the present invention will be discussed herein. Since the target base station and the mobile unit 205 are both using copies of the temporary Authorization Key, the communication link may be considered a secure link. However, as discussed above, the mobile unit 205 and the target access serving network 215 should negotiate a new security association as soon as possible. The mobile unit 205 may therefore determine (at 250) whether or not the communication link has been successfully established. The mobile unit 205 may also determine (at 255) whether or not the channel conditions are reliable enough to conduct the full mutually authenticated PMK generation procedure with the target access serving network 215. For example, the mobile unit 205 may monitor one or more pilot signals to determine the channel condition.

Once the mobile unit 205 determines (at 250 and/or 255) that the conditions are appropriate, the mobile unit 205 provides (at 260) information indicating that a security association should be negotiated with the target access serving network 215. The mobile unit 205 and the target access serving network 215 may then negotiate (at 265) a new security association. For example, the mobile unit and the target access serving network 215 may negotiate (at 265) a new value of a Pairwise Master Key, as discussed in detail above. The target access serving network 215 may become the new anchor when the new security association has been successfully negotiated (at 265).

Distributing temporary security keys as discussed above may have a number of advantages over conventional practice. The security risks associated with handing off to base stations in less trusted (or un-trusted) domains may be reduced by providing a temporary Authorization Key to the target base station and requiring that the security association with the target access serving network be negotiated as soon as possible. The reliability of the complete EAP procedure may be increased by delaying the procedure until after the handoff is complete and the channel conditions of the new communication link are acceptably good. Accordingly, renegotiating the security association after the handoff may reduce the likelihood that the communication link is dropped during a handoff.

In embodiments where the TEK is provided to the target base station, the aforementioned techniques may also reduce the likelihood that an unscrupulous target base station may use the TEK indefinitely without ever changing the TEK. For example, mobile units may receive information indicating that the PMK should be re-established at earliest convenience following a handoff to the target base station. This will invoke creation of a new mutually authenticated PMK in the target access serving network, and result in creation of a new AK that can be used subsequently by all legitimate base stations. If the target base station is not among the legitimate base stations, it will not receive the new AK and will only have the temporary AK received from the source access serving network. The illegitimate target base station will not be able to hand-off the mobile unit to other illegitimate base stations, which should localize problems associated with an illegitimate target base station using the temporary AK. For another example, once the PMK is re-generated, the mobile unit expects the target base station to re-establish the new TEK as soon as the remaining pre-encrypted data buffer is depleted. If the new TEK is not established, perhaps because the target base station is illegitimate, the mobile unit may decide to discontinue the communications, which may minimize any problems associated with an illegitimate target base station using the old value of the TEK.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of wireless communication involving at least one first base station having a secure association with a first access serving network represented by a first pairwise master key, the first access serving network having a secure association with an authentication server, and at least one second base station associated with a second access serving network that does not have a secure association with the authentication server, the method being implemented in a mobile unit and comprising:

generating, at the mobile unit using the first pairwise master key, a first key, and wherein a copy of the first key has been generated by the first access serving network using the pairwise master key and transmitted to the second access serving network;

receiving information indicating that the first key is temporary; and establishing a temporary security association with the second base station using the first key.

2. The method of claim 1, wherein generating the first key comprises generating the first key using, the first pairwise master key and an identifier associated with the second base station.

3. The method of claim 2, wherein receiving the information indicating that the first key is temporary comprises receiving information indicating that the first key was generated using the first pairwise master key.

4. The method of claim 3, wherein receiving the information indicating that the first key is temporary comprises receiving information indicating that a second pairwise master key is to be generated by the second access serving network.

5. The method of claim 4, comprising negotiating the second pairwise master key with the second access serving network.

6. The method of claim 5, wherein negotiating the second pairwise master key comprises negotiating the second pairwise master key in response to receiving the information indicating that the first key is temporary.

7. The method of claim 5, wherein negotiating the second pairwise master key comprises:
determining a channel condition associated with the communication link with the second base station; and
negotiating the second pairwise master key when the channel condition are determined to be reliable enough to conduct mutual authentication.

8. The method of claim 1, comprising receiving encrypted data from the second base station, the encrypted data being provided to the second base station by the first base station, and wherein the encrypted data has been encrypted using at least one encryption key derived from the first key.

9. A method of wireless communication involving a mobile unit, at least one first base station having a secure association with a first access serving network represented by a first pairwise master key, the first access serving network having a secure association with an authentication server, and at least one second base station associated with a second access serving network that does not have a secure association with the authentication server, the method being implemented in the first access serving network and comprising:
generating a first key using the first pairwise master key, wherein a copy of the first key has been generated by the mobile unit using the first pairwise master key;
providing, to the second access network, information indicative of the first key; and
providing, to the second access network, information indicating that the first key is temporary.

10. The method of claim 9, comprising generating the first key using the first pairwise master key associated with the first access serving network and an identifier associated with the second base station.

11. The method of claim 9, wherein providing the information indicative of the first key comprises providing the information indicative of the first key to at least one of the mobile unit, the second base station, and the second access serving network.

12. The method of claim 9, wherein providing the information indicative of the first key comprises providing the information indicative of the first key in response to determining that the mobile unit is being handed off to the second base station.

13. The method of claim 9, wherein providing the information indicating that the first key is temporary comprises providing the information indicating that the first key is temporary to at least one of the mobile unit, the second base station, and the second access serving network.

14. The method of claim 9, wherein providing the information indicating that the first key is temporary comprises providing the information indicating that the first key is temporary in response to determining that the mobile unit is being handed off to the second base station.

15. The method of claim 9, comprising providing a random number and data encrypted using the random number and the first key to the second base station.

16. A method of wireless communication involving a mobile unit, at least one first base station having a secure association with a first access serving network represented by a first pairwise master key, the first access serving network having a secure association with an authentication server and at least one second base station associated with a second access serving network that does not have a secure association with the authentication server, the method comprising:
receiving information indicative of a first key generated by the first access serving network using the first pairwise master key;
receiving information indicating that the first key is temporary; and
establishing a temporary security association with the mobile unit using the first key.

17. The method of claim 16, wherein receiving said information indicative of the first key comprises receiving information indicative of a first key generated using the first pairwise master key associated with the first access serving network and an identifier associated with the second base station.

18. The method of claim 17, wherein receiving the information indicating that the first key is temporary comprises receiving information indicating that a second pairwise master key is to be generated by the second access serving network.

19. The method of claim 18, comprising negotiating the second pairwise master key with the mobile unit.

20. The method of claim 19, comprising receiving a request to negotiate the second pairwise master key from the mobile unit when the mobile unit determines that channel conditions are reliable enough to conduct mutual authentication, and wherein negotiating the second pairwise master key comprises negotiating the second pairwise master key in response to receiving the request from the mobile unit.

21. The method of claim 16, comprising receiving a random number and data encrypted using the random number and the first key from the second base station.

* * * * *

UNITED STATES PATENT AND TRADEMARK OFFICE
CERTIFICATE OF CORRECTION

PATENT NO.        : 7,602,918 B2                                           Page 1 of 1
APPLICATION NO. : 11/173144
DATED             : October 13, 2009
INVENTOR(S)       : Mizikovsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Fifth Day of October, 2010

David J. Kappos
*Director of the United States Patent and Trademark Office*